(12) United States Patent
Kallabis et al.

(10) Patent No.: US 8,171,649 B2
(45) Date of Patent: May 8, 2012

(54) LASER DEVICE

(75) Inventors: Gabriel Kallabis, Spirkelbach (DE); Thomas Kremer, Annweiler am Trifels (DE)

(73) Assignee: Stabila Messgerate Gustav Ullrich GmbH, Annweiler (DE)

( * ) Notice: Subject to any disclaimer, the term of this patent is extended or adjusted under 35 U.S.C. 154(b) by 250 days.

(21) Appl. No.: 12/541,212

(22) Filed: Aug. 14, 2009

(65) Prior Publication Data
US 2010/0050447 A1 Mar. 4, 2010

(30) Foreign Application Priority Data
Aug. 28, 2008 (DE) .................. 20 2008 008 821 U

(51) Int. Cl.
*G01C 15/00* (2006.01)
*G01C 5/02* (2006.01)
(52) U.S. Cl. ......... 33/290; 33/291; 33/286; 33/DIG. 21; 356/139.1
(58) Field of Classification Search .................. 33/227, 33/228, 281, 283, 285, 286, 290–292, 299, 33/1 M, DIG. 21; 269/19; 356/18, 248–250, 356/138, 139.05, 139.06, 148; 403/291
See application file for complete search history.

(56) References Cited

U.S. PATENT DOCUMENTS

| | | | | |
|---|---|---|---|---|
| 5,754,582 A | * | 5/1998 | Dong | 372/107 |
| 5,991,005 A | * | 11/1999 | Horikawa et al. | 355/53 |
| 6,346,710 B1 | * | 2/2002 | Ue | 250/442.11 |
| 6,577,388 B2 | * | 6/2003 | Kallabis | 356/139.1 |
| 6,860,020 B2 | * | 3/2005 | Pahk et al. | 33/1 M |
| 7,373,724 B2 | * | 5/2008 | Qi et al. | 33/291 |
| 2007/0044333 A1 | | 3/2007 | Qi et al. | |

FOREIGN PATENT DOCUMENTS

| | | |
|---|---|---|
| DE | 19 757 461 | 6/1999 |
| DE | 10 2004 011 724 | 9/2005 |
| DE | 10 2004 024 755 | 12/2005 |
| DE | 10 2004 052 154 | 5/2006 |
| DE | 10 2004 053 249 | 5/2006 |
| DE | 10 2006 004 898 | 8/2007 |

* cited by examiner

*Primary Examiner* — Amy Cohen Johnson
(74) *Attorney, Agent, or Firm* — Dennison, Schultz & MacDonald

(57) ABSTRACT

A laser device, including a cradle with a laser unit exiting from this, the cradle being connected to a base element, relative to which the cradle can be adjusted in terms of inclination by at least one actuating drive. In order to achieve a secure mounting of the cradle for the laser unit with simple structural means, while at the same time eliminating any play between the mutually tilting parts, it is proposed that the cradle be connected to the base element, first, by a solid joint, and secondly by two adjusting drives, wherein the adjusting drives are arranged with respect to the solid joint so that the lines of connection between lengthwise axis of the solid joint and the adjusting drives subtend a right angle.

20 Claims, 6 Drawing Sheets

LASER DEVICE

BACKGROUND OF THE INVENTION

The invention concerns a laser device, especially a rotation laser, comprising a cradle with a laser unit coming out from this and possibly with a rotation head deflecting a laser beam in a plane of rotation, wherein the cradle is connected to a base element, relative to which the cradle can be adjusted in terms of inclination by at least one actuating drive.

Tilting or ball and socket joints are usually employed in rotation lasers in order to orient the rotation head with the axis of rotation for a pentaprism or an equivalent element by means of which the laser beam is deflected in a plane of rotation. The rotation head can emerge from a sensor housing, which is connected via a ball and socket joint, for example, to a frame, to which the sensor housing is oriented. Electronic levels are located in the sensor housing in order to determine verticality. In a feedback control circuit, the sensor housing is adjusted by two servo-motors to enable the desired verticality for the sensor housing and thus an orienting of the plane of rotation to the horizontal. Preferably, spindle drives are used for this.

Tilting joints are also known, comprising two legs, which engage in turn with servo-motors to orient the corresponding axes of rotation. Furthermore, bearings can be produced with universal joints.

In a rotation construction laser according to EP-B-1 484 578, a laser unit with rotation part connected to it comes out from a universal ball joint bearing, which is mounted in a frame. A similar design is found in EP-A-0 854 351.

In order to orient the laser beam emitted by a rotation head of a rotation laser to the horizontal, U.S. Pat. No. 6,688,011 provides mutually adjustable plates as a bearing for a laser unit with the rotation head.

The known designs have the drawback that, besides a costly design due to a plurality of mechanical parts on account of mounting the structural unit containing the laser unit and the laser head which can be adjusted relative to a frame or housing known as the base, a play is present between these, leading to an inaccuracy in the orienting of the plane of rotation to the horizontal or a frequent fine-tuning adjustment.

DE-A-10 2004 024 755 describes a support for an optical element that is connected to a carrier via solid joints.

A rotation bearing according to DE-C-10 2004 052 154 consists of a spherical or pyramidal bearing basket having openings, supporting an optical mirror relative to a carrier. Thanks to the rotation bearing, one is supposed to achieve a highly precise adjustability of the optical mirror. Adjusting drives are provided for the adjustment.

According to DE-B-10 2004 011 724, a miniaturized two-axis piezo-activation device solid bending joint is provided, which extends in a plane in which a carrier frame is connected to a plate.

To compensate for thermal effects in a position measuring device, according to DE-A-10 2006 004 898 solid joints are provided, running between a carrier and an adapter.

The subject of DE-A-10 2004 053 249 is a construction laser with tiltable swivel means, the adjustment occurring by a piezo-actuator.

SUMMARY OF THE INVENTION

The basic problem of the present invention is to modify a laser device such as a rotation laser of the above-mentioned kind so that a secure bearing to receive the laser unit is produced by structurally simple means, and at the same time any play between the mutually tilting parts should be ruled out.

To solve the problem, the invention basically calls for the cradle being connected to the base element, first, by a solid joint, and secondly by two adjusting drives, wherein the adjusting drives are arranged with respect to the solid joint so that the lines of connection between lengthwise axis of the solid joint and the adjusting drives subtend a right angle.

Departing from previously known solutions, the base element or frame of the laser device, such as a rotation laser, and the cradle also known as a carrier for the laser unit and the rotation head (if present) form a single part, wherein cradle and base element can be adjusted relative to each other by tilting via the solid joint to the required extent. Thanks to the use of the preferably rodlike, or cuboid or cylindrical solid joint, one achieves a tilting of the cradle to the base element with no friction and no play. Lubrication is not needed. There is no maintenance for the joint itself.

The relative movement of cradle and base element occurs by two adjusting drives, through which the cradle is connected to the base element, the adjusting drives being arranged with respect to the solid joint so that the lines of connection between lengthwise axis of the solid joint and the lengthwise axes of the adjusting drives subtend a right angle. This ensures that a tilting of the cradle relative to the base element about a single defined axis occurs when a servo-motor is activated.

In particular, it is provided that each adjusting drive comprises a spindle with a spindle nut braced against the base element, it being possible to adjust the spindle in the direction of rotation by a motor exiting from the cradle.

To enable a precise adjustment, one modification of the invention calls for mounting the spindle nuts of the adjusting drives on the base element at support points which lie in one or approximately in one plane, in which the pivot point of the solid joint lies.

Preferably, the spindle nut is in the shape of a sleeve and it encloses the spindle.

Other actuators can also be used as adjusting drives, such as piezo-elements.

In a modification of the invention, the cradle comprises a ground plate, from which a housing for the laser unit emerges, which can be connected to a rotation head or contain said head.

The base element itself is preferably in the shape of a plate, so that the solid joint consequently joins together two plate-like parts.

The cradle and its ground plate form a unit with the solid joint and the base element. The unit will be made from plastic, especially polypropylene. Preferably, the cradle and the ground plate with the solid joint and the base element is an injection molded part.

Preferably, the solid joint forming a solid body has a cuboid geometry, at least for a portion. The lines of connection running between the adjusting drives and the lengthwise axis of the solid joint should run perpendicular or nearly perpendicular through outer surfaces of the section of the solid joint having the cuboid geometry.

In particular, the solid joint is formed of a middle piece having a cuboid geometry and end segments extending on either side and increasing in cross section, passing into the ground plate or the base element.

One would also stay within the scope of the invention if the middle piece is configured such that its outer surfaces are curved, i.e., they have a radius, without necessarily abandoning the desired effect of the cuboid.

Furthermore, the solid joint should be fashioned symmetrically to a plane perpendicularly intersecting the lengthwise axis of the solid joint, and preferably the plane extends in the middle between facing surfaces of the ground plate and the base element.

BRIEF DESCRIPTION OF THE DRAWINGS

Further details, advantages and features of the invention will emerge not only from the claims and the features found therein—by themselves or in combination—but also from the following description of a preferred sample embodiment taken from the drawings In the drawings:

DESCRIPTION OF THE PREFERRED EMBODIMENTS

Figure 1:
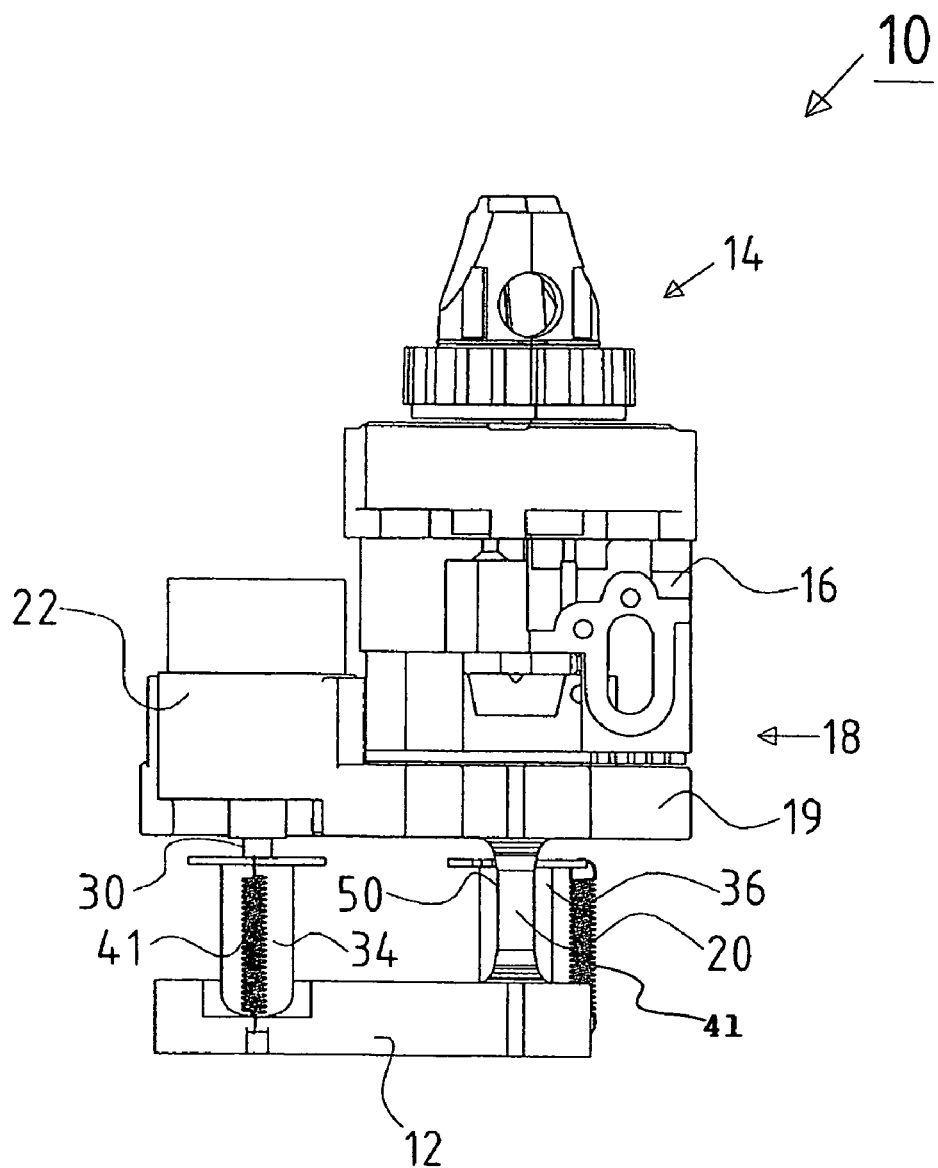
FIG. 1 is a first side view of a rotation laser.
Figure 2:
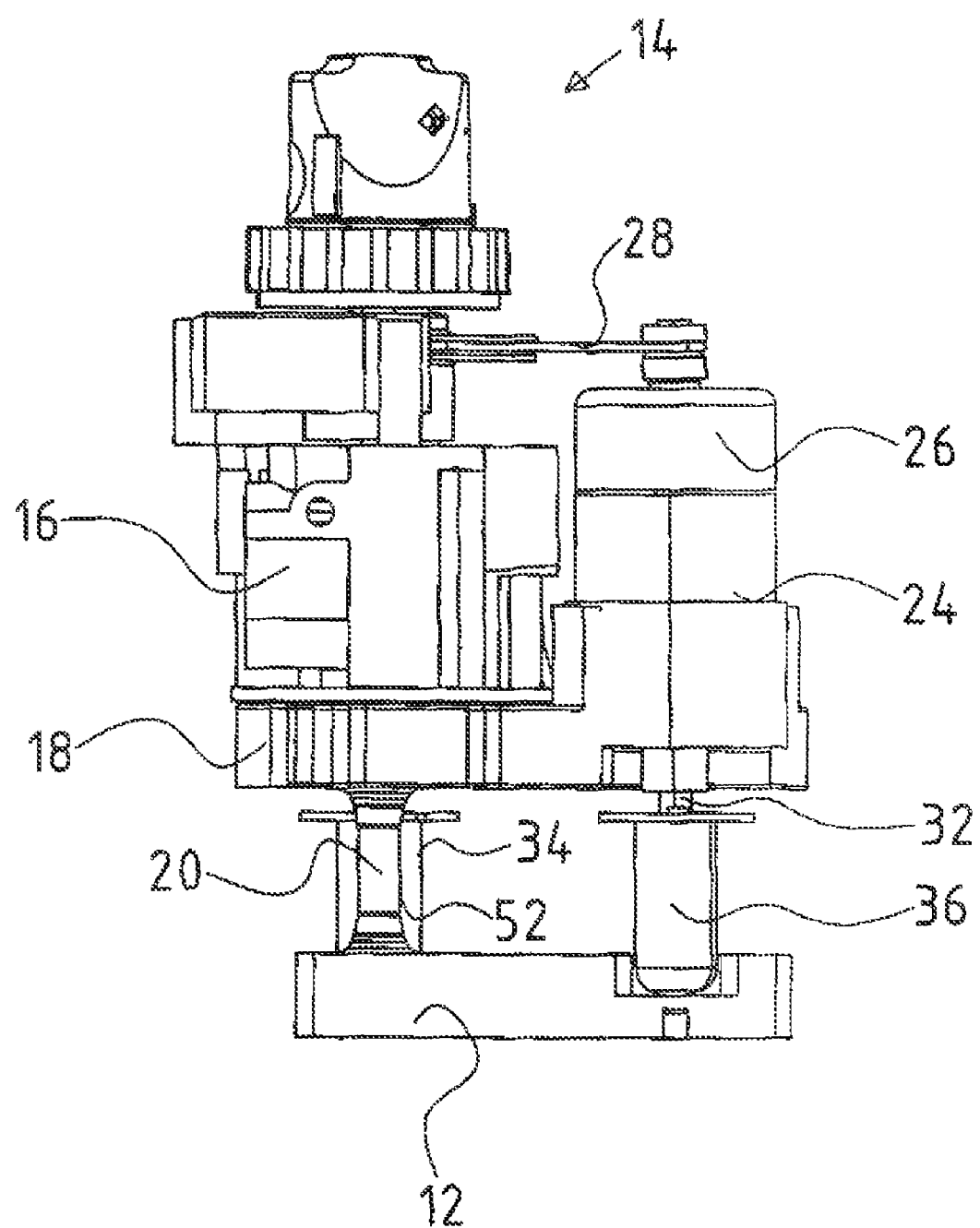
FIG. 2 shows the rotation laser of FIG. 1 in a position rotated by 90 degrees.
Figure 3:
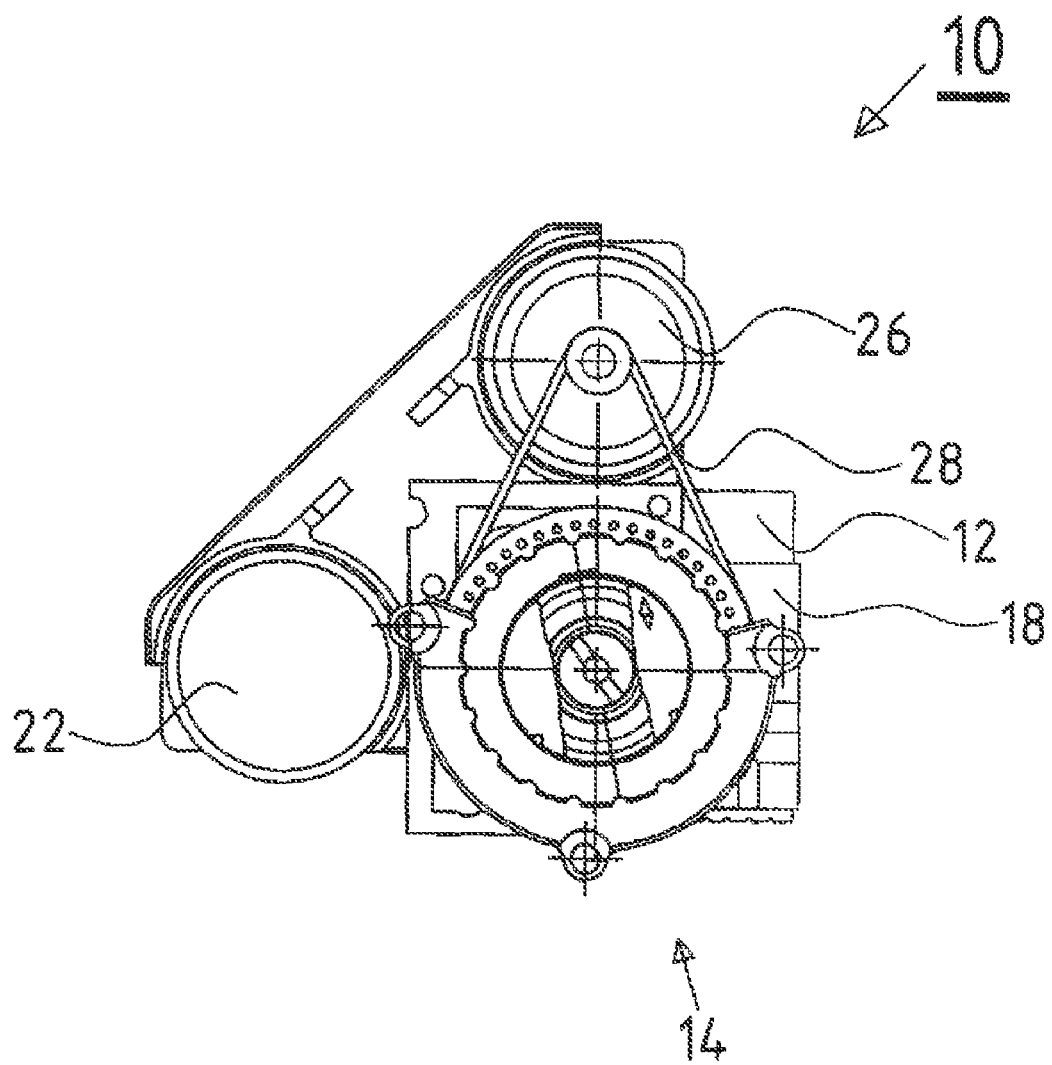
FIG. 3 is a top view of the rotation laser of FIGS. 1 and 2.
Figure 4:
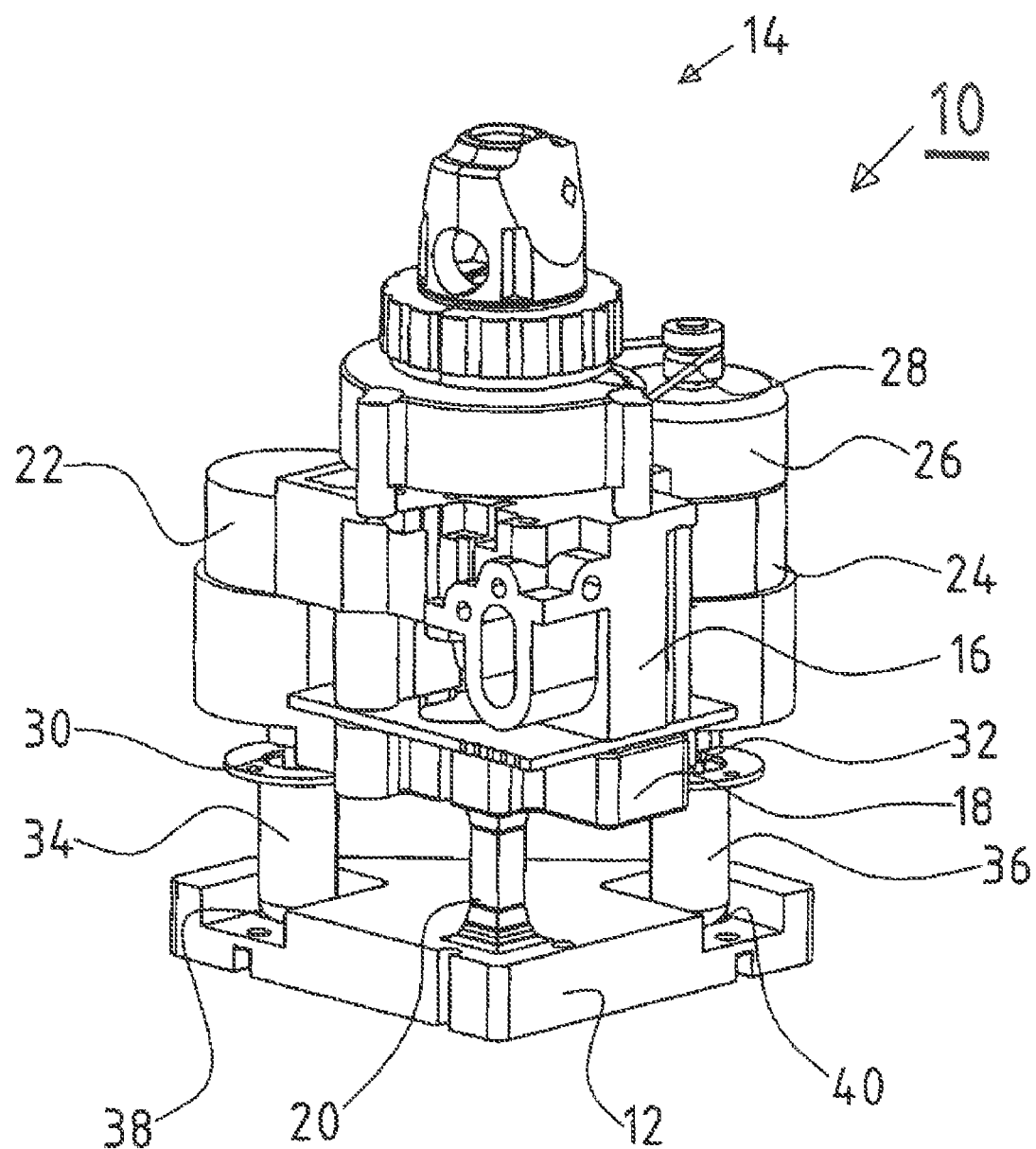
FIG. 4 is a first perspective view of the rotation laser of FIGS. 1 to 3.
Figure 5:
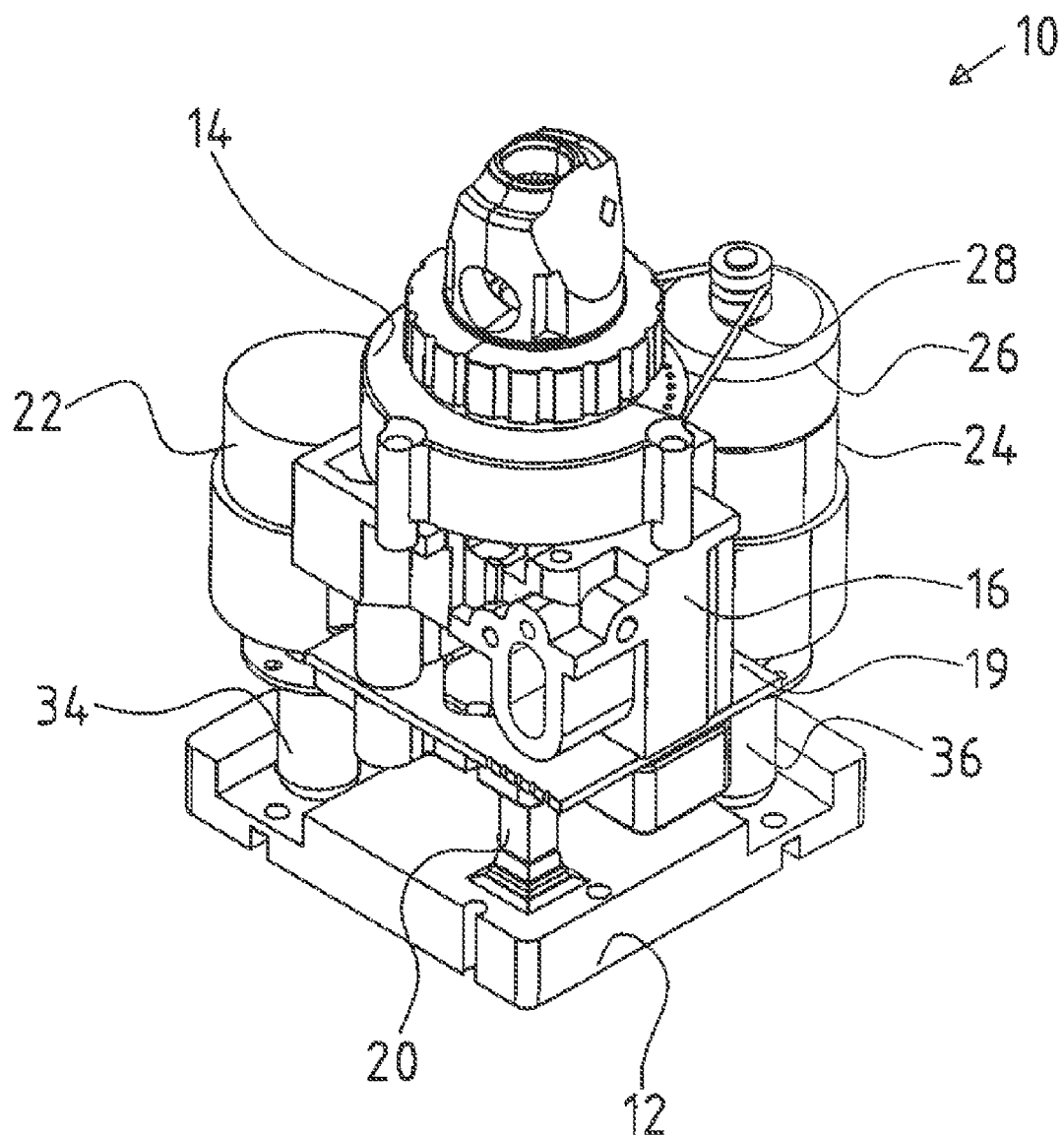
FIG. 5 is a second perspective view of the rotation laser of FIGS. 1 to 3.
Figure 6:
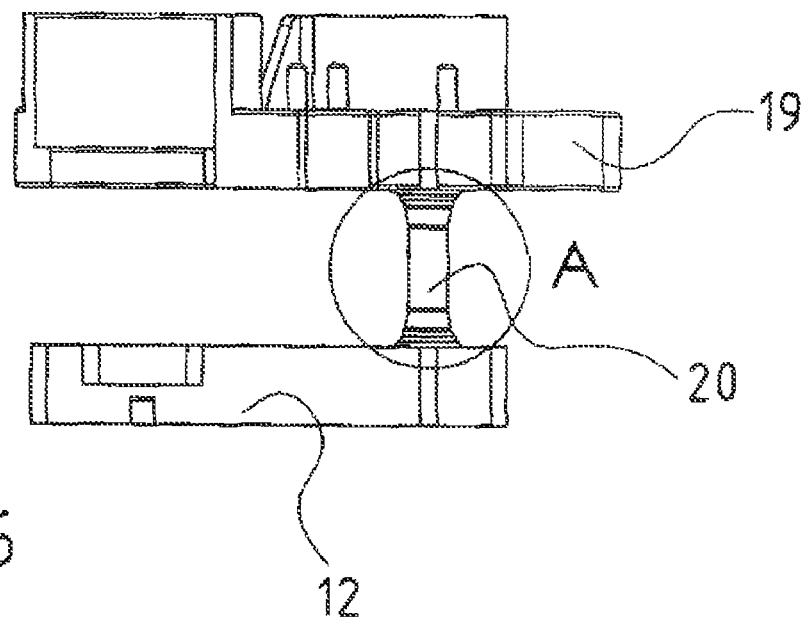
FIG. 6 shows elements of the rotation laser of FIGS. 1-5.

The invention will now be explained by means of a rotation laser, without this limiting the invention. The figures, in which the same elements are provided with the same reference numbers, show the inner part, i.e., the core of the rotation laser, which is indicated by the reference 10 and arranged in an outer housing of the laser (not shown). A corresponding rotation laser, also called a rotation construction laser, comprising a laser beam rotating at least by segments, is used in the construction industry, for example, in order to determine a defined inclined plane, especially a horizontally extending plane. For this, a laser beam is emitted by a laser unit, which is deflected by around 90 degrees by a deflection device, which in turn is mounted so that it can turn in a rotation head. The axis of rotation intersects the axis of the deflected laser beam. The deflection device can be, e.g., a pentaprism. It must be possible to adjust the laser unit with the rotation head to the desired degree relative to a base of the rotation laser in order to adjust the desired plane of rotation of the laser light. For orienting to the horizontal, the laser unit and the cradle holding the rotation head have electronic levels for the purpose of activating adjusting drives in a feedback control circuit to accomplish the desired horizontal orienting of the cradle to a base element supporting the rotation laser. In this regard, however, rather familiar designs are involved, not needing any further explanation.

The inner part of the rotation laser shown in the figures comprises a platelike base element 12, which extends inside the housing (not shown) of the rotation laser, but also if necessary closes off the housing at the bottom. The base element 12 is in the shape of a plate, without this limiting the invention in any way.

The rotation head 14 and the laser unit arranged in a housing 16 come out from a cradle 18, also known as a carrier. The carrier 18 is in the shape of a plate or it comprises a platelike carrier element 19 and is connected to the base element 12 by a solid joint 20, according to the invention.

In the housing 16 there are electronic levels or similar elements (not shown), whose output signals are used to regulate motors including gearings so as to orient the cradle 18, regardless of the position of the base element 12 to the horizontal, so that the laser beam deflected by the rotation head 14 can be deflected in a horizontally extending plane of rotation. The beam deflection device present in the rotation head 14, such as a pentaprism, is moved in rotary motion by means of another motor 26 and a belt 28. The rotation head with the housing 16 emerging from the cradle 18 can form a unit, but preferably they are separately produced parts.

Each servo-motor 22, 24 places a spindle 30, 32 in rotary movement. These engage with a spindle nut, fashioned as a sleeve 34, 36, which in turn is supported on the base element 12 or in depressions 38, 40 formed in it. Thus, upon activation of the motor 22 or 24, the spindles 30, 32 are adjusted relative to the sleeve 34, 36, so that the cradle 18 can be tilted relative to the base element 12 to the desired extent.

In order to avoid any play when the spindles 30, 32 are activated, it is furthermore preferable to connect the sleeve 34, 36 to a spring element 41, so that a relative movement in the lengthwise direction of the sleeve 34, 36 to the base element 12 is prevented.

The spindles 30, 32 and spindle sleeves 34, 36 making possible the tilting or inclining of the cradle 18 to the base element 12 are oriented to the solid joint 20 so that connection lines running between them, i.e., one connection line between the lengthwise axis of the spindle 30 and the lengthwise axis of the solid joint 20, on the one hand, and a connection line between the lengthwise axis of the spindle 32 and the lengthwise axis of the solid joint 20, on the other hand, subtend a right or nearly right angle. This makes sure that a tilting of the cradle 18 and, thus, the laser unit and the rotation head 14 occurs in only one axis when a motor 22-24 is activated.

As follows from the schematic drawing, the solid joint has a cuboid geometry, and the solid joint 20 is assembled from a middle piece 42 and end segments 44, 46, which pass into the cradle 18 and the base element 12, respectively. The cross section of the solid joint 20 increases from the middle piece 42 toward the cradle 18 and the base element 12.

Figure 7:
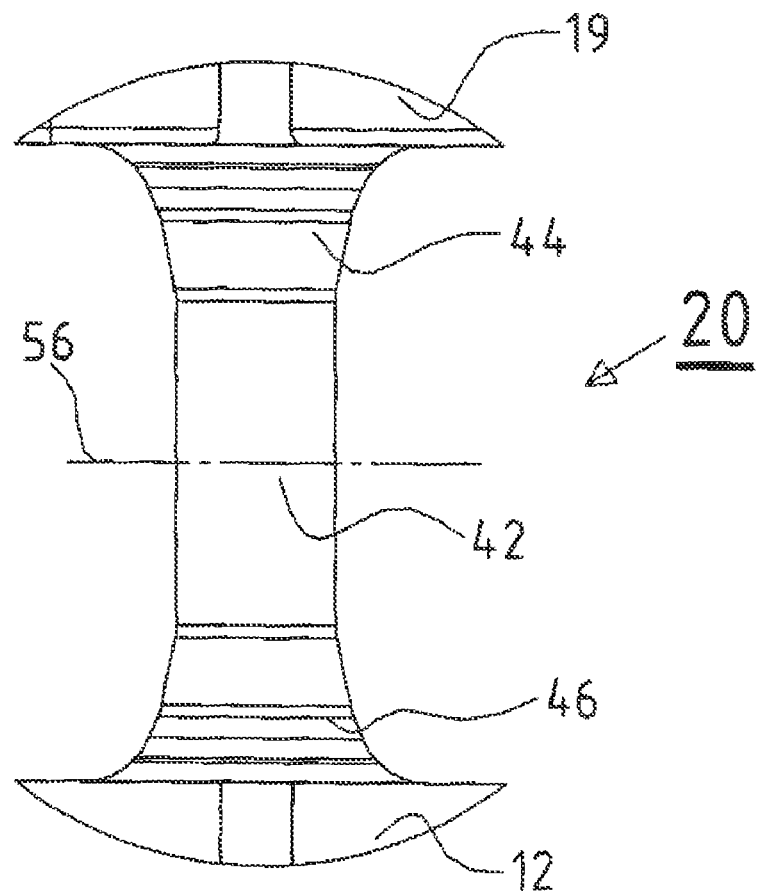
FIG. 7 is an enlarged view of region A of FIG. 6.

Moreover, the solid joint 20 is fashioned symmetrical to a plane (broken line 56 in FIG. 7) that perpendicularly intersects the lengthwise axis of the solid joint 20 and runs down the middle between facing surfaces of the carrier plate 19 and the base plate 12. The solid joint 20 emerges from the surfaces.

Furthermore, the solid joint 20 is oriented to the spindles 30, 32 so that the lines emerging from these and intersecting the lengthwise axis of the solid joint 20 pass perpendicularly through the outer surfaces 50, 52 of the middle piece 42.

Thanks to the arrangement of the spindles 30, 32 and the spindle nuts 34, 36 relative to the solid joint 20 and its cuboid geometry, the orienting of the outer sides 50, 52 to the spindles 30, 32 ensures that the solid joint 20 can tilt about two planes displaced from each other by 90 degrees and independently of each other.

Thanks to the solid joint 20 of the invention, the tilting of the cradle 18 relative to the base element 12 is free of play and no friction occurs. Thus, neither is lubrication necessary. Moreover, the solid joint is maintenance-free.

The cradle 18 with the solid joint 20 and the base element 12 are preferably madeof of polypropylene or another suitable material, like POM (polyoxymethylene) and are preferably made by injection molding. Thus, a cost-favorable production of the corresponding unit is possible. The housing 16 accommodating the laser unit can be a part made separately from the cradle 18 or the carrier plate 19, and it can be connected to the cradle 18 by screw or detent connections.

While the teaching of the invention with the solid joint can be used preferably for laser devices in the form of rotation lasers, a usage for other applications in which an optical beam is supposed to be adjusted relative to a base to a desired degree is also suitable.

What is claimed is:

1. A laser device, comprising a cradle (18) with a laser unit exiting from the cradle,
   wherein the cradle is connected to a base element (12), relative to which the cradle can be adjusted in terms of inclination by at least one adjusting drive (22, 24),
   wherein the cradle (18) is connected to the base element (12), first, by a solid joint (20), and secondly by two adjusting drives (22, 24),
   wherein the cradle (18) with carrier plate (19), the base element (12), and the solid joint (20) form a unit made of plastic, and
   wherein the adjusting drives are arranged with respect to the solid joint (20) so that imaginary lines of connection between a lengthwise axis of the solid joint and the adjusting drives subtend a right angle.

2. A laser device according to claim 1, wherein each adjusting drive (22, 24) comprises a spindle (30, 32) with a spindle nut (34, 36) braced against the base element (12), it being possible to adjust the spindle in a direction of rotation by a motor starting from the cradle (18).

3. A laser device according to claim 2, wherein the spindle nut (34, 36) is in the shape of a sleeve and it is braced against the base element (12).

4. A laser device according to claim 2, wherein support points of the spindle nuts (34, 36) on the base element (12) and the pivot point of the solid joint (20) lie in or approximately in a common plane.

5. A laser device according to claim 2, wherein the spindle nut (34, 36) is connected to the base element (12) via a spring element.

6. A laser device according to claim 1, wherein the adjusting drives are actuators.

7. A laser device according to claim 1, wherein the cradle (18) comprises a carrier plate (19), from which a housing (16) for the laser unit emerges.

8. A laser device according to claim 7, wherein a rotation head emerges from the carrier plate.

9. A laser device according to claim 1, wherein the cradle (18), the carrier plate (19), the solid joint (20), and the base element (12) are injection molded parts.

10. A laser device according to claim 1, wherein at least a portion of the solid joint (20) has a cuboid or cube-like geometry.

11. A laser device according to claim 10, wherein lines of connection starting from the adjusting drives (22, 24) run perpendicular or nearly perpendicular through outer surfaces (50, 52) of the solid joint (20) having the cuboid geometry.

12. A laser device according to claim 1, wherein the solid joint (20) comprises a middle piece (42) having a cuboid or cube-like geometry and end segments (44, 46) extending on either side and increasing in cross section, wherein the end segments pass into the cradle (18) or carrier plate (19), and the base element (12).

13. A laser device according to claim 12, wherein the middle piece comprises outer surfaces that are curved and have a radius.

14. A laser device according to claim 1, wherein the solid joint (20) is fashioned symmetrically to a plane perpendicularly intersecting the lengthwise axis of the solid joint.

15. A laser device according to claim 14, wherein the plane extends in a middle portion between facing surfaces of the cradle (18) and the base element (12).

16. A laser device according to claim 1, wherein the base element (12) is in the shape of a plate.

17. A laser device according to claim 1, wherein the device is a rotation laser.

18. A laser device according to claim 1, wherein the cradle further comprises a rotation head deflecting a laser beam in a plane of rotation.

19. A laser device according to claim 1, wherein the actuators are piezo-elements.

20. A laser device according to claim 1, wherein the plastic is selected from the group consisting of polypropylene and polyoxymethylene.

* * * * *